United States Patent
Teshima et al.

(10) Patent No.: US 10,406,934 B2
(45) Date of Patent: Sep. 10, 2019

(54) FUEL CELL SYSTEM FOR VEHICLE

(71) Applicants: AISAN KOGYO KABUSHIKI KAISHA, Obu-shi, Aichi-ken (JP); TOYOTA JIDOSHA KABUSHIKI KAISHA, Toyota-shi, Aichi-ken (JP)

(72) Inventors: Nobutaka Teshima, Toyota (JP); Kei Enomoto, Nisshin (JP)

(73) Assignees: AISAN KOGYO KABUSHIKI KAISHA, Obu (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/880,477

(22) Filed: Jan. 25, 2018

(65) Prior Publication Data
US 2018/0272888 A1    Sep. 27, 2018

(30) Foreign Application Priority Data
Mar. 21, 2017 (JP) .................. 2017-054391

(51) Int. Cl.
| | | |
|---|---|---|
| H01M 8/04 | (2016.01) | |
| B60L 11/18 | (2006.01) | |
| H01M 8/0438 | (2016.01) | |
| H01M 8/247 | (2016.01) | |
| H01M 8/04089 | (2016.01) | |
| H01M 8/04082 | (2016.01) | |
| H01M 8/0444 | (2016.01) | |
| H01M 8/04664 | (2016.01) | |
| B60L 50/71 | (2019.01) | |

(52) U.S. Cl.
CPC .......... *B60L 11/1896* (2013.01); *B60L 50/71* (2019.02); *H01M 8/0441* (2013.01); *H01M 8/0444* (2013.01); *H01M 8/04089* (2013.01); *H01M 8/04201* (2013.01); *H01M 8/04402* (2013.01); *H01M 8/04686* (2013.01); *H01M 8/247* (2013.01); *B60L 2270/145* (2013.01); *H01M 2250/20* (2013.01); *Y02T 10/7005* (2013.01)

(58) Field of Classification Search
None
See application file for complete search history.

(56) References Cited

FOREIGN PATENT DOCUMENTS

| | | |
|---|---|---|
| JP | 2006-164716 A | 6/2006 |
| JP | 2014-135219 A | 7/2014 |

*Primary Examiner* — Tracy M Dove
(74) *Attorney, Agent, or Firm* — Oliff PLC

(57) ABSTRACT

A fuel cell system for a vehicle for preventing intrusion of water in a relief valve without providing a casing or a waterproof sheet for the relief valve is provided. The fuel cell system comprises a fuel cell stack placed in a front room of a vehicle, a power control unit to perform output control of the fuel cell stack, a hydrogen supply path for supplying hydrogen gas to the fuel cell stack, and the relief valve provided in half way of the hydrogen supply path. The relief valve is placed above the fuel cell stack in the front room and includes an exhaust port. The exhaust port is placed facing an upper surface of a casing of the power control unit with a clearance such that the hydrogen gas is ejected downward through the exhaust port in the direction of gravity.

5 Claims, 3 Drawing Sheets

FUEL CELL SYSTEM FOR VEHICLE

CROSS-REFERENCE TO RELATED APPLICATIONS

This application is based upon and claims the benefit of priority from the prior Japanese Patent Application No. 2017-054391, filed Mar. 21, 2017, the entire contents of which are incorporated herein by reference.

BACKGROUND

Technical Field

The present disclosure relates to a fuel cell system for a vehicle mounted in a fuel cell vehicle.

Related Art

A fuel cell vehicle mounted with a fuel cell system has been put into practice in recent years. A fuel cell system for a vehicle mounted in a fuel cell vehicle is provided in half way of a gas supply path with a relief valve to prevent extreme increase in pressure in the gas supply path which is configured to supply fuel gas to a fuel cell stack (see Patent Document 1). When the pressure in the gas supply path exceeds the predetermined pressure, the relief valve is opened to keep the pressure in the gas supply path less than the predetermined pressure.

RELATED ART DOCUMENTS

Patent Documents

Patent Document 1: JP2014-135219A

SUMMARY

Technical Problem

A fuel cell system for a vehicle mounted in a fuel cell vehicle is usually placed in an underfloor space or a front room of a vehicle interior, and thus there is a possibility of water entering in the relief valve. Intrusion of water in the relief valve may lead to generation of rust in the valve, which could result in valve-opening failure that the relief valve cannot be opened. To address this problem, in the fuel cell system for the vehicle, the relief valve needs to be accommodated in a sealed casing or needs to be covered with a waterproof sheet.

The present disclosure has been made to solve the above problem and has a purpose of providing a fuel cell system for a vehicle enabling to prevent intrusion of water in a relief valve without providing a casing or a waterproof sheet.

Means of Solving the Problems

An embodiment of the present disclosure made to solve the above problem is a fuel cell system for a vehicle mounted in a fuel cell vehicle, the fuel cell system comprising: a fuel cell stack placed in a front room of a vehicle; a power control unit configured to perform output control of the fuel cell stack; a gas supply path for supplying fuel gas to the fuel cell stack; and a relief valve provided in half way of the gas supply path, wherein the relief valve is placed above the fuel cell stack in the front room, and an exhaust port provided in the relief valve is placed facing a flat surface of another component with a clearance such that the fuel gas is ejected downward through the exhaust port in the direction of gravity.

This fuel cell system for the vehicle is configured such that the relief valve is placed above the fuel cell stack in the front room, and thus submersion of the relief valve can be prevented. Further, the exhaust port of the relief valve is placed facing the flat surface of another component with a clearance such that the fuel gas discharged from the exhaust port is ejected downward in the direction of gravity, and thus intrusion of water into the relief valve through the exhaust port can be prevented even when the water enters in the front room during vehicle running or high-pressure vehicle washing. Accordingly, there is no need to accommodate the relief valve in a sealed casing or provide a waterproof sheet for the relief valve. Intrusion of water in the relief valve can be thus prevented without providing a casing or a waterproof sheet for the relief valve. A casing and a waterproof sheet are unnecessary as mentioned above, and this contributes to cost reduction of the fuel cell system for the vehicle.

Further, the fuel gas is ejected toward the flat surface of another component from the exhaust port of the relief valve, and an ejection target of the fuel gas ejected from the relief valve is not located at a contact of an electrical connector or the like. This improves safety of the relief valve while the valve is opened (during relieving the pressure). Furthermore, the relief valve can be placed near a fuel gas detector which is usually placed in an uppermost part of the front room. The fuel gas is ejected downward from the relief valve toward the flat surface in the direction of gravity, and then the ejected gas hits on the flat surface and flows upward toward an upper part of the front room. Thus, leakage of the fuel gas can be quickly detected while the relief valve is opened (during relieving the pressure).

According to a fuel cell system for a vehicle of the present disclosure, it is achieved to prevent intrusion of water in a relief valve without providing a casing or a waterproof sheet for the relief valve.

DETAILED DESCRIPTION OF THE EXEMPLARY EMBODIMENTS

Figure 1:
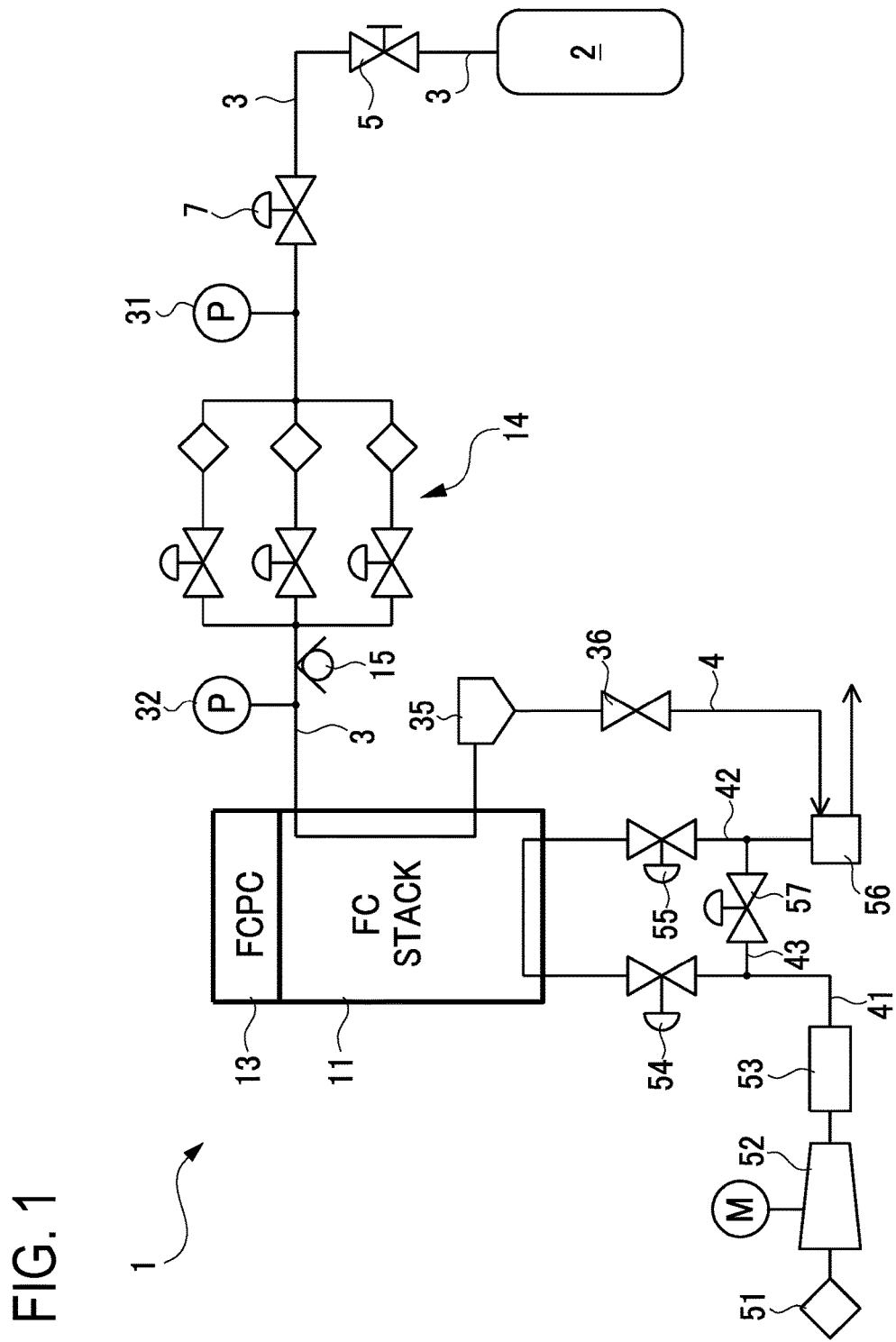
FIG. 1 is a schematic block diagram of a fuel cell system.

A fuel cell system embodying the present disclosure is explained in detail with reference to the accompanying drawings of FIGS. 1 to 3. A fuel cell system 1 is mounted in a fuel cell vehicle and used for supplying electricity to a drive motor (not shown) of the vehicle. The fuel cell system 1 is provided with, as shown in FIG. 1, a fuel cell stack (FC stack) 11, a power control unit (FCPC) 13, and a hydrogen cylinder 2.

The fuel cell stack 11 is configured to generate electricity upon receipt of supply of hydrogen gas as fuel gas and air as oxidizer gas. As shown in FIG. 2, this fuel cell stack 11 is accommodated in a sealed casing 11a having a rectangular shape in section and placed in a front room 20 formed in a body 10b of a vehicle 10. To be more specific, the fuel cell stack 11 is placed on a mounting frame 23 which is attached to an end portion of a suspension member 21 provided in the vehicle 10 via vibration isolation members 22. The electricity generated in the fuel cell stack 11 is made to be supplied to the drive motor (not shown) of the vehicle through the power control unit 13. The power control unit 13 is accommodated in a sealed casing 13a having a rectangular sectional shape and placed above the fuel cell stack 11 (above an upper surface 11u of the casing 11a). The drive motor is controlled based on a separate instruction. The hydrogen cylinder 2 contains high-pressure hydrogen gas.

On an anode side of the fuel cell stack 11, there are provided a hydrogen supply path 3 to supply hydrogen gas to the fuel cell stack 11 from the hydrogen cylinder 2, and a hydrogen discharge path 4 to discharge hydrogen off-gas which is discharged out of the fuel cell stack 11. The hydrogen supply path 3 corresponds to one example of a gas supply path of the present disclosure. On a directly downstream side of the hydrogen cylinder 2 in the hydrogen supply path 3, there is provided a main stop valve 5 constituted of an electromagnetic valve to switch supply and shut-off of hydrogen gas from the hydrogen cylinder 2 to the hydrogen supply path 3.

On a downstream side of the main stop valve 5 in the hydrogen supply path 3, there is provided a high-pressure regulator 7 to decompress pressure of the hydrogen gas. On a downstream side of the high-pressure regulator 7 in the hydrogen supply path 3, there is provided an injector 14 to regulate a flow rate of the hydrogen gas which is to be supplied to the fuel cell stack 11. A pressure sensor 31 is provided directly upstream of the injector 14 in the hydrogen supply path 3 to detect pressure between the high-pressure regulator 7 and the injector 14.

On a downstream side of the injector 14 in the hydrogen supply path 3, there is provided a pressure sensor 32 to detect pressure between the injector 14 and the fuel cell stack 11. Further, a relief valve 15 is provided between the injector 14 and the fuel cell stack 11, more specifically, between the injector 14 and the pressure sensor 32. The relief valve 15 is configured to open when the pressure in the hydrogen supply path 3 between the injector 14 and the fuel cell stack 11 reaches a predetermined pressure or more, and thus the pressure is kept less than the predetermined pressure. The pressure in the hydrogen supply path 3 between the injector 14 and the fuel cell stack 11 is thus regulated to become not too high.

In the hydrogen discharge path 4, there are provided, in the order from a side of the fuel cell stack 11, a vapor liquid separator 35 to separate liquid contained in the hydrogen off-gas, and an exhaust and drain valve 36 to switch shut-off and discharge of the hydrogen off-gas and liquid which are to be discharged, from the vapor liquid separator 35 to a diluter 56 provided on a cathode side.

On the cathode side of the fuel cell stack 11, there are provided an air supply path 41 to supply air to the fuel cell stack 11, an air discharge path 42 to discharge air off-gas which is discharged out of the fuel cell stack 11, and a bypass path 43 connecting the air supply path 41 and the air discharge path 42. The bypass path 43 is a passage for flowing air to the air discharge path 42 from the air supply path 41 without passing through the fuel cell stack 11.

In the air supply path 41, there are provided, in the order from a side of an air cleaner 51, a compressor 52 to supply air to the fuel cell stack 11, an intercooler 53 to cool the air, and an upstream-side valve 54 to switch supply and shut-off of the air to the fuel cell stack 11. The air cleaner 51 is a device for cleaning air which has been taken from an outside of the fuel cell system 1.

Further, in the air discharge path 42, there are placed, in the order from a side of the fuel cell stack 11, a downstream-side valve 55 to regulate a discharge amount of air off-gas discharged from the fuel cell stack 11 by adjusting back pressure of the fuel cell stack 11, and a diluter 56 to dilute the hydrogen off-gas discharged through the hydrogen discharge path 4 by use of the air off-gas and the air that are flowing through the bypass path 43. A bypass valve 57 is provided in the bypath path 43, and this bypass valve 57 is configured to regulate a flow rate of air in the bypass path 43.

The fuel cell system 1 having the above-mentioned configuration is configured such that the hydrogen gas supplied from the hydrogen cylinder 2 flows through the hydrogen supply path 3 and is supplied to the fuel cell stack 11 through the main stop valve 5, the high-pressure regulator 7, and the injector 14. On the other side, the air discharged in the air supply path 41 by the compressor 52 is supplied to the fuel cell stack 11. Electricity is thus generated in the fuel cell stack 11.

The hydrogen gas supplied to the fuel cell stack 11 is used for electricity generation in the fuel cell stack 11, and after that, the hydrogen gas is discharged out of the fuel cell system 1 as the hydrogen off-gas from the fuel cell stack 11 through the hydrogen discharge path 4 and the diluter 56. The air having been supplied to the fuel cell stack 11 is used for electricity generation in the fuel cell stack 11, and after that, the air is discharged out of the fuel cell system 1 as the air off-gas from the fuel cell stack 11 through the air discharge path 42 and the diluter 56.

Figure 3:
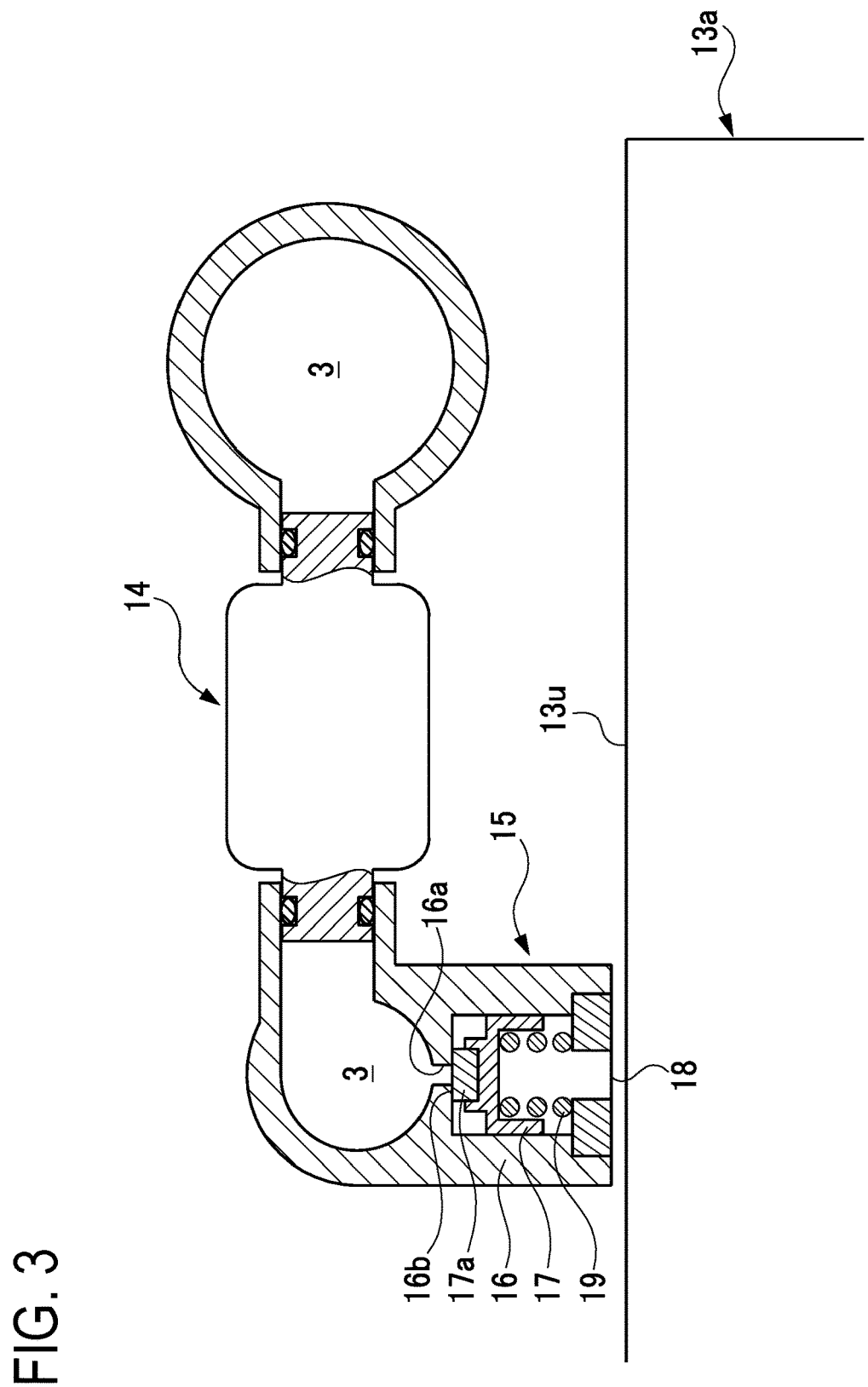
FIG. 3 is a schematic view showing a configuration of a relief valve and its placement position.

The relief valve 15 is, as shown in FIG. 3, provided with a valve housing 16, a piston 17 slidable in the valve housing 16, an exhaust port 18, and a spring 19 for urging the piston 17 in a valve-closing direction. The valve housing 16 is integrated into a pipe member constituting the hydrogen supply path 3 and provided with an inflow port 16a communicating with the hydrogen supply path 3 and a valve seat 16b formed around the inflow port 16a. The piston 17 is provided with a valve element 17a on a side closer to the inflow port 16a. The spring 19 is provided in the piston 17 on a side closer to the exhaust port 18, and the piston 17 is urged toward the inflow port 16a (in a valve-closing direction) by this spring 19. Thus, the valve element 17a of the piston 17 is pressed against the valve seat 16b.

When the pressure between the injector 14 and the fuel cell stack 11 in the hydrogen supply path 3 reaches a predetermined pressure or more, the piston 17 moves toward the exhaust port 18 against the urging force of the spring 19, and then the valve element 17a is separated from the valve seat 16b. The relief valve 15 is thus opened, and the hydrogen gas is discharged out of the exhaust port 18, so that the pressure in the hydrogen supply path 3 is adjusted to be less than the predetermined pressure.

Figure 2:
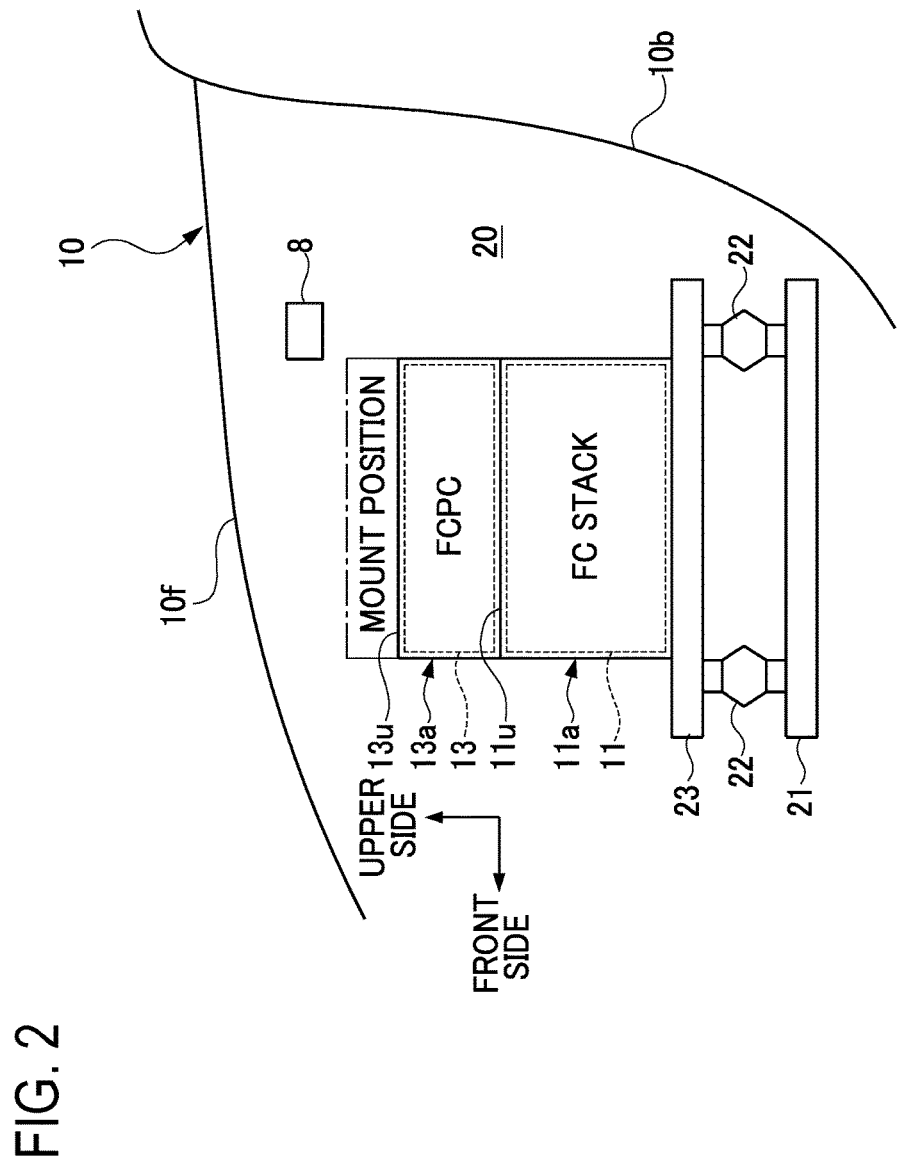
FIG. 2 is a block diagram illustrating placement positions of each component in a front room.

This relief valve 15 is placed in the front room 20 of the vehicle 1 in a mount position above the fuel cell stack 11 (for example, with a height of 500 mm or more from the ground) as indicated with a chain line in FIG. 2 such that the exhaust port 18 is placed facing a flat surface of another component placed in the front room 20 with a predetermined clearance (of about several millimeters), and this configuration allows the hydrogen gas discharged out of the exhaust port 18 to be ejected downward in the direction of gravity at the time of relief. In the present embodiment, the relief valve 15 is configured such that the exhaust port 18 is placed facing an upper surface 13u of a casing 13a of the power control unit 13 as shown in FIG. 3.

The above-mentioned configuration prevents submersion of the relief valve 15 and intrusion of water in the relief valve 15 through the exhaust port 18 even when the water enters in the front room 20 during vehicle running or high-pressure vehicle washing. Accordingly, there is no need to accommodate the relief valve 15 in a sealed casing or provide a waterproof sheet for the relief valve 15. Namely, the relief valve 15 can be prevented from intrusion of water without providing a casing or a waterproof sheet for the relief valve 15. The relief valve 15 does not need the casing or the waterproof sheet as mentioned above, and therefore, cost reduction of the fuel cell system 1 is achieved.

During relieving the pressure, the hydrogen gas is being ejected from the exhaust port 18 of the relief valve 15 toward the flat surface of another component (in the present embodiment, the upper surface 13*u* of the casing 13*a* of the power control unit 13). A contact of an electrical connector or the like is not located at an ejection target of the hydrogen gas which is ejected from the relief valve 15, and therefore, safety at the time of opening the relief valve 15 is enhanced. Further, the hydrogen gas is ejected from the relief valve 15 toward the upper surface 13*u* of the casing 13*a* of the power control unit 13, which has a comparably large area. As a result of this, the hydrogen gas ejected from the relief valve 15 instantly expands and is diluted, further enhancing the safety at the time of opening the relief valve 15.

The relief valve 15 may further be placed near a hydrogen gas detector 8 placed in an uppermost position of the front room 20 (directly under a hood 10*f*) as shown in FIG. 3. The hydrogen gas is ejected downward from the relief valve 15 toward the flat surface (the upper surface 13*u* of the casing 13*a*) in the direction of gravity as mentioned above, and the ejected hydrogen gas then hits on the flat surface (the upper surface 13*u* of the casing 13*a*) and expands in a wide area to further flow upward in the front room 20. This upward flow of the gas enables the hydrogen gas detector 8 to quickly detect leakage of the hydrogen gas during opening of the relief valve 15 (during relieving the pressure).

According to the above-mentioned fuel cell system 1 of the present embodiment, the relief valve 15 is placed above the fuel cell stack 11 in the front room 20, and the exhaust port 18 provided in the relief valve 15 is placed facing the upper surface 13*u* of the casing 13*a* of the power control unit 13 with a clearance so that the hydrogen gas ejected from the exhaust port 18 is ejected downward in the direction of gravity. It is thus possible to prevent intrusion of water in the relief valve 15 from the exhaust port 18 even when water enters in the front room 20 during vehicle running or high-pressure vehicle washing with no need to provide a casing or a waterproof sheet for the relief valve 15.

The above-mentioned embodiment is merely an example and gives no limitation to the present disclosure. The present disclosure may be applied with various improvements and modifications without departing from the essential characteristics thereof. For example, the exhaust port 18 of the relief valve 15 is placed facing the upper surface 13*u* of the casing 13*a* of the power control unit 13 in the above embodiment, but alternatively, the exhaust port 18 may be placed facing the upper surface 11*u* of the casing 11*a* of the fuel cell stack 11.

According to this alternative configuration, the hydrogen gas is ejected from the relief valve 15 toward the upper surface 11*u* of the casing 11*a* which has a relatively large area, and thus the hydrogen gas ejected from the relief valve 15 instantly expands in a wide range and is diluted, further enhancing the safety at the time of opening the relief valve 15 (during relieving the pressure).

REFERENCE SIGNS LIST

1 Fuel cell system
3 Hydrogen supply path
10 Vehicle
11 Fuel cell stack
11*a* Casing
11*u* Upper surface
13 Power control unit
13*a* Casing
13*u* Upper surface
15 Relief valve
18 Exhaust port
20 Front room

What is claimed is:

1. A fuel cell system mounted in a fuel cell vehicle, the fuel cell system comprising:
    a fuel cell stack placed in a front room of the fuel cell vehicle;
    a power control unit programmed to perform output control of the fuel cell stack;
    a gas supply path for supplying fuel gas to the fuel cell stack; and
    a relief valve provided in the gas supply path, wherein
        the relief valve is placed above the fuel cell stack in the front room, and
        an exhaust port provided in the relief valve is placed facing a flat surface of a casing of the fuel cell stack or of a casing of the power control unit with a clearance between the exhaust port and the flat surface such that the fuel gas is ejected downward through the exhaust port in a direction of gravity.

2. The fuel cell system mounted in the fuel cell vehicle according to claim 1, wherein the flat surface of the casing of the fuel cell stack or the casing of the power control unit is, respectively, an upper surface of the casing of the fuel cell stack or an upper surface of the casing of the power control unit.

3. The fuel cell system mounted in the fuel cell vehicle according to claim 1, wherein the relief valve is placed near a fuel gas detector which is placed in an uppermost part of the front room.

4. The fuel cell system mounted in the fuel cell vehicle according to claim 1, wherein the relief valve is placed with a height of 500 mm or more from a ground.

5. The fuel cell system mounted in the fuel cell vehicle according to claim 1, wherein the gas supply path is provided with an injector to regulate a flow rate of the fuel gas which is to be supplied to the fuel cell stack, and
    the relief valve is provided between the injector and the fuel cell stack.

\* \* \* \* \*